United States Patent Office 3,161,475
Patented Dec. 15, 1964

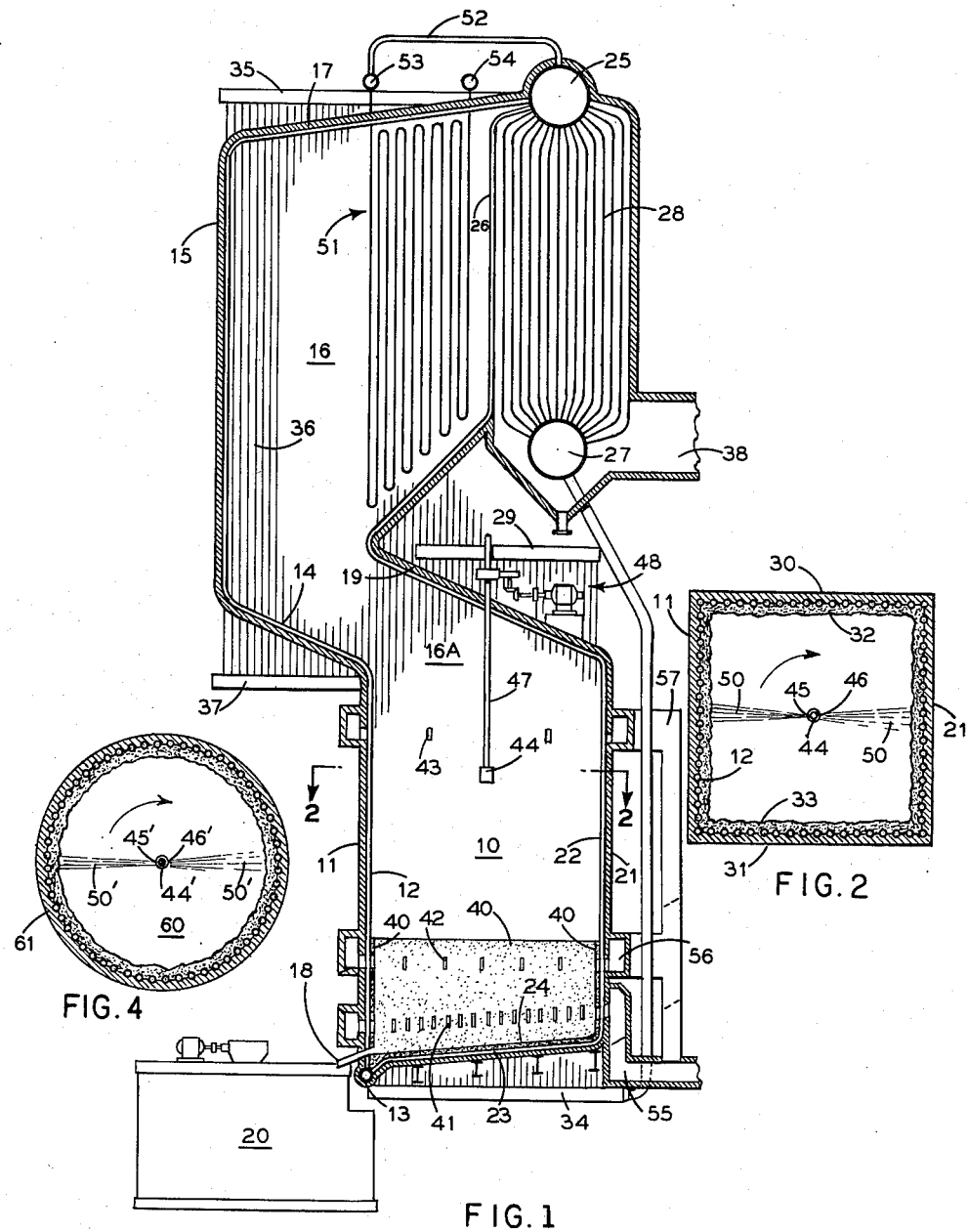

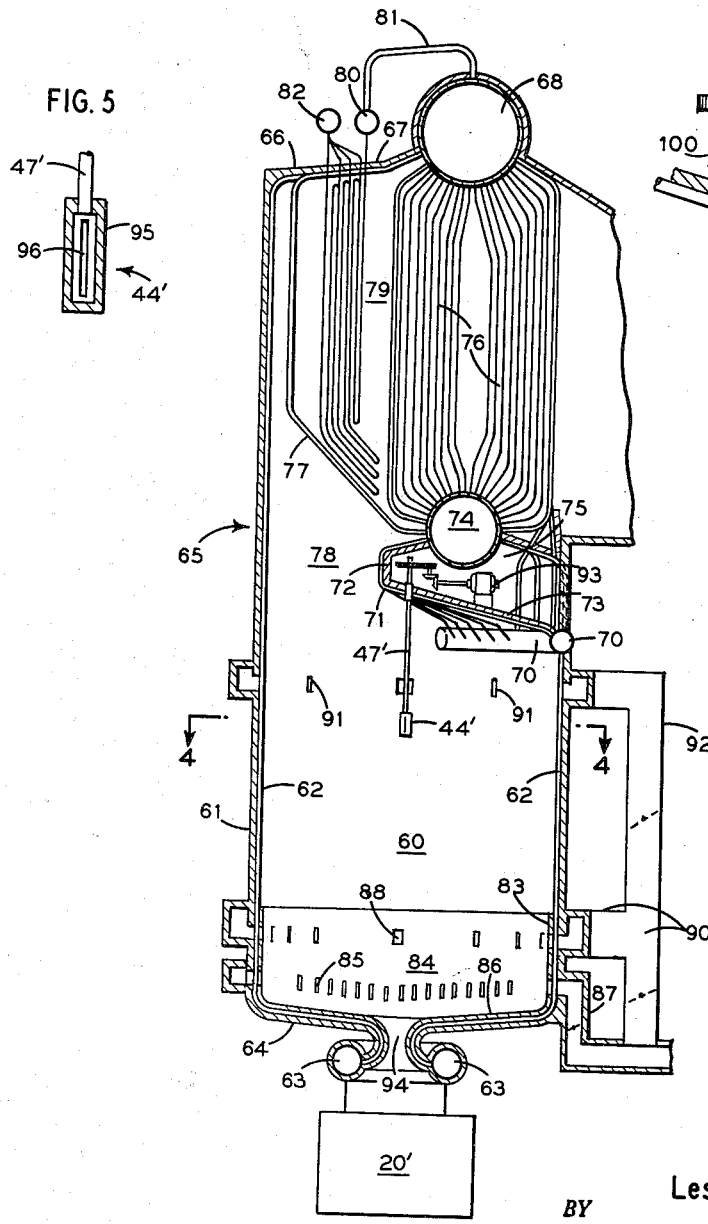

3,161,475
CHEMICAL AND HEAT RECOVERY APPARATUS
Leslie S. Wilcoxson, Akron, Ohio, assignor to The Babcock & Wilcox Company, New York, N.Y., a corporation of New Jersey
Filed June 22, 1960, Ser. No. 38,055
6 Claims. (Cl. 23—262)

The present invention relates to the recovery of heat and chemicals from residual liquors and more particularly to the incineration of residual liquors obtained in the pulping of wood.

In the pulping process, the digestion of wood chips preparatory to the preparation of wood pulp results in the production of residual waste liquor. It is advantageous to reclaim the chemicals in such residual liquors and to utilize the combustible constituents of the liquor for the generation of usable power. Ordinarily, when the soda, kraft, sodium base bisulphite and semi-chemical cooking liquors are used for the digestion of wood chips, the residual liquor can be incinerated within a furnace for heat and chemical recovery.

In the incineration of residual liquor, it has been customary to project a relatively coarse spray of the liquor across the width of a furnace in a flat sheet so it will impinge on the furnace walls. While the projection of the liquor through the hot furnace gases evaporates a portion of the entrained moisture, this drying process proceeds as the liquor, upon hitting the furnace walls, forms a reactive char which subsequently falls in lumps to the hearth or floor of the incinerating furance. On the hearth the char is burned under reducing conditions at temperatures in excess of the fusion temperature of the chemical ash residue, with the inorganic chemicals reduced by reaction with the carbon in the char, discharged in a molten condition from the furnace. The combustible constituents of the liquor not only provide the heat and reactive constituents to reduce the chemicals but also produce heat which may be utilized to generate and superheat steam.

Heretofore, positioning the residual liquor spray nozzle in one wall has directed the spray across the rising stream of hot combustion products so that the liquor will deposit only on the opposite and side walls of the incinerating furnace. With the trend to high capacity units, it becomes desirable to utilize the maximum available furnace wall surface for the drying of the char. Thus, by effectively utilizing area in all of the furnace walls, the capacity of the furnace for incinerating residual liquor is increased so that, for an equal capacity, the overall dimensions of the furnace may be reduced from those dictated by the previous practice for the same service conditions.

In accordance with the present invention, I provide a furnace wherein the liquor is projected against all of the upright walls so as to effectively increase the proportionate amount of wall contacting surface available for liquor drying. This is accomplished by positioning the liquor spray nozzle on the axial centerline of the furnace, and rotating the spray nozzle so all of the walls of the furnace are contacted by the liquor spray.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:
FIG. 1 is a sectional elevation of a chemical recovery unit constructed in accordance with my invention;
FIG. 2 is a section taken on the line 2—2 of FIG. 1;
FIG. 3 is a sectional elevation of a modified form of a chemical recovery unit;
FIG. 4 is a section taken on the line 4—4 of FIG. 3;
FIG. 5 is an enlarged section of the spray nozzle shown in FIGS. 1 and 3; and
FIG. 6 is an enlarged elevation of a rotating and reciprocation mechanism shown in FIGS. 1 and 3.

In the embodiment of the invention illustrated in the drawings, the furnace is constructed for the incineration of pulp residual liquor, with the hot gaseous products of incineration thereafter passing over tubular heat exchange elements for the generation and superheating of steam. In units of the type illustrated, the residual liquor is burned under reducing conditions to recover the inorganic chemical constituents of the liquor in the form of a molten smelt, while the organic materials in the liquor provide the heat for the smelting process, with the hot gases therefrom serving to generate steam.

As shown in FIG. 1, the residual liquor incinerating furnace 10 is provided with upright boundary walls, with a gas outlet on one side leading to a gas flow passageway for discharge of the heating gases into the heating gas pass of the boiler unit. The furnace walls are provided with upright rows of water cooling tubes which are connected into the circulatory system of the boiler.

As shown particularly in FIG. 1, the front wall 11 is provided with a row of furnace cooling tubes 12 which extend upwardly from a transverse header 13 to a position at the upper end portion of the furnace. The tubes are then bent in row formation in an upwardly inclined direction to form the lower wall portion 14 of a gas flow passageway 16. Thereafter, the tubes 12 are extended upwardly to form the front wall 15 of the gas pass 16 and are then bent in a horizontally inclined direction to form a roof 17 opening into the upper drum 25 of the steam generating unit. Certain of the tubes 12 in the front wall 11 are displaced to provide an opening for a smelt discharge spout 18 which discharges molten smelt into a smelt tank 20. The tubes of the wall 11 are further displaced to provide combustion air openings, as hereinafter described.

The rear wall 21 of the furnace 10 also is provided with a row of upright tubes 22 with the lower portion 23 of the tubes downwardly inclined from the wall to open into the header 13 and to form a hearth 24 at the bottom of the furnace. At a level substantially equivalent to the outlet from the furnace, the rear wall tubes are forwardly bent in generally parallel, spaced relationship to the tube portions 14 of the front wall to form the furnace roof 19, at one side of the gas pass 16A leading from the furnace 10 to the passageway 16. The tubes 22 are then bent in an upward and rearwardly inclined direction from a position upwardly adjacent the furnace roof 19 to form a lower wall portion of the gas pass 16. Thereafter, the tubes 22 extend upwardly to open into the upper drum 25 of the steam generating unit, and to define a slag screen 26 at the gas discharge end of the gas pass 16 and upstream of the tube bank 28 which interconnects the upper and lower drums 25 and 27. The side walls 30 and 31 of the furnace 10 (see FIG. 2) are provided with upright rows of steam generating tubes 32 and 33 respectively which extend upwardly from horizontally disposed headers 34 located on opposite sides of the unit beneath the furnace hearth. Some of the furnace sidewall tubes 32 and 33 adjacent the rear wall 21 extend upwardly beyond the roof 19 to a header 29. Other of the furnace side wall tubes adjacent the front wall 11 extend upwardly to open into a horizontally disposed upper header 35 which connects with the steam and water drum 25. Other side wall tubes 36 connect a lower header 37 with the horizontally disposed upper header 35 to form a portion of the side walls of the gas pass 16. Some of the tubes 32 extend upwardly from header 29 to header 35 to cooperate with side wall tubes extending upwardly from headers 34 and 37 to define the side walls of the connecting gas passageways 16, with the opposite side wall of similar construction.

With the construction described, the walls of the furnace 10 and the gas pass 16 which directs the heating gases into the banks of steam generating tubes 28 are completely water cooled. The gases after passing through the boiler tube bank 28 are discharged through a gas outlet 38 located substantially at the level of the lower drum 27 of the boiler. The gases may then be directed over various of the usual forms of heat traps such as economizer tube banks, and/or air heating surfaces and direct contact evaporators, before being discharged to the atmosphere.

As shown particularly in FIG. 1, the lowermost portions of the front, rear and side wall tubes in the lower portion of the furnace 10 are covered with refractory material 40 to aid in maintaining the requisite temperature in the combustion zone. The lower portion 23 of the rear wall tubes which supports the hearth 24 is also covered with an initially plastic refractory material, such as chrome ore. The walls of the furnace 10 are provided with rows of air inlet ports for the admission of combustion air to the furnace. The primary combustion air ports 41 are located in the walls of the furnace upwardly adjacent the surface of the hearth 24. Secondary air ports 42 are also located in the walls of the furnace at a position spaced upwardly from the primary air ports 41. In addition to the primary and secondary air ports, a row of tertiary air ports 43 is provided in the upper portion of the furnace adjacent the outlet therefrom. The flow of combustion air to the rows of air inlet ports 41 and 42 is controlled by regulation of air flow through the dampered ducts 55, 56 and 57 to maintain reducing conditions in the lower portion of the furnace while the tertiary air ports 43 are intended to supply the remainder of the combustion air required for complete combustion of the combustible materials in the residual liquor.

In accordance with the present invention, I provide a spray nozzle 44 for the introduction of residual liquor into the furnace so that the liquor is uniformly distributed over the walls of the furnace. To accomplish this, I provide a spray nozzle having vertically slotted openings 45 and 46 on opposite sides of the nozzle (see FIG. 2). The nozzle is supplied with residual liquor through an essentially vertical liquor supply pipe 47 which is positioned generally on the axial centerline of the furnace. To obtain the necessary distribution of residual liquor to the furnace, I rotate the supply pipe 47 and the nozzle 44 attached to the lower end thereof at a controlled rate by means of a geared motor drive 48, such as illustrated (see also FIG. 6). The residual liquor discharged from the slotted spray nozzle projects a coarse spray 50 of liquor across the furnace in substantially vertical sheets. The slotted outlets are on opposite sides of the nozzle so the reactive forces due to the liquor discharge are balanced.

With the controlled rotation of the nozzle, the liquor discharge toward and deposited on the confining walls of the furnace is substantially equal throughout the 360 degrees of nozzle travel. With the sheets of liquor being substantially vertical, the entrainment of liquid droplets in the rising gas stream is at a minimum, while at the same time effective drying of the liquor is initiated. The coarse spray of residual liquor is partially dehydrated in transit across the furnace and it impinges upon and sticks to the confining walls of the furnace. As the dehydration progresses, the char which is produced falls from the wall in chunks onto the hearth and is incinerated by the impinging jets of combustion air introduced through the primary air ports 41, so that it is smelted and the inorganic chemicals removed in molten form by gravity flow from the hearth by the smelt spout 18 and into the smelt tank 20.

The products of partial combustion rising in gaseous form from the char deposited on the hearth 24 are ignited and at least partially consumed by the combustion air entering through the secondary air nozzles 42. The air discharged from these nozzles may be directed in upward, downward or horizontal directions or in any combination of such directions to attain good mixing with the combustion gases. The final phase in the combustion process occurs when the streams of tertiary air entering the furnace through the ports 43 interact with the gases rising from the hearth.

If desired, a superheater 51 may be provided in the gas flow path upstream of the screen 26 as shown in FIG. 1. The superheater may consist of a plurality of reverse bend tube elements receiving saturated steam from the drum 25 through pipes 52 and an inlet header 53, with the superheated steam collected in an outlet header 54 for discharge to a point of use.

In the embodiment of the invention shown in FIGS. 3 and 4, the recovery unit is of circular horizontal cross-section with the furnace constructed and arranged for the incineration of pulp residual liquor. As in the FIG. 1 disclosure, the liquor is delivered to the furnace through a rotating liquor spray nozzle 44' positioned axially of the furnace. The liquor is discharged from the nozzle as a sheet of spray 50' projected generally parallel to the direction of gas flow rising from the lower portion of the furnace (see FIG. 4) so as to minimize liquor entrainment in the hot gases.

As shown in FIG. 3, the furnace 60 is provided with walls 61 containing vapor generating tubes 62 which extend upwardly from a lower annular header 63 positioned beneath the bottom 64 of the furnace. A major number of the tubes 62 extend upwardly throughout the vertical extent of the boiler setting 65 and their upper end portions 66 are curved to form a portion of the roof 67, and open into the upper drum 68 of the boiler. A minor number of the tubes 62 extend upwardly to a position intermediate the height of the cylindrical setting 65 to open into a header 70 which is the segment of a circle in form. From the header 70, tubes 71 extend inwardly of the furnace 60, upwardly around the end 72 of a nose baffle 73 and open to the lower drum 74 of the boiler. The nose baffle 73, protected by the tubes 71 positioned on the exterior surface thereof, is provided with refractory materials to form a hollow vestibule 75 between the lower surface of the baffle 73 and the drum 74 of the boiler unit.

The drums 68 and 74 of the boiler unit are connected by upright banks of tubes 76. Other tubes 77 are extended forwardly and upwardly from the drum 74 in a row substantially across the space 78 upwardly above and between the end of the nose baffle 73 and the opposite wall of the boiler setting so as to form a slag screen. The tubes 77 of the slag screen extend upwardly and are bent to follow the configuration of the roof 67 with the tubes thereafter opening into the upper drum 68. The fluid flow circuit of the vapor generating unit is completed by downcomers (not shown) which connect the lower drum 74 with the annular header 63 at the bottom of the furnace 60.

As shown in FIG. 3, the unit is provided with a dependent superheater 79 which is formed with a plurality of downwardly extending loops connecting a saturated steam inlet header 80, which receives saturated steam from the upper drum 68 through the connecting row of tubes 81, and an outlet header 82 from which the superheated steam is delivered to a point or points of use.

The lower portion of the furnace is provided with refractory materials 83 inwardly of the circumferential row of tubes 62 so as to define a furnace section 84 in which the residual liquor, in char form as hereinafter described, is incinerated. A row of primary air inlet ports 85 is positioned upwardly adjacent the refractory covered lower portions of the tubes 62 which define the hearth 86 of the furnace, where the ports 85 are provided with air delivered thereto from an external source (not shown) through a connecting dampered duct 87. The primary air ports 85 are relatively closely spaced and are positioned throughout the circumference of the furnace so as to direct impinging jets of combustion air against the char bed formed in the bottom of the furnace 60.

Spaced above the primary air ports is a circumferential row of secondary air ports 88 which are supplied with air through a dampered duct 90. Advantageously, the secondary air ports 88 may be arranged with a minor portion thereof directed in a downward direction at, for example, an angle of 10°, while other ports are so constructed so as to direct streams of combustion air in an upwardly inclined direction at an angle of, for example, 10° with respect to the horizontal. Still other ports in the row of secondary air ports 88 may be directed substantially horizontally into the furnace. The secondary air port arrangement described advantageously improves the mixing effect of the air introduced into the gases of combustion rising from the lower portion of the furnace 60.

As disclosed in connection with the FIG. 1 version of the invention, the furnace of FIG. 3 is also provided with a row of tertiary air inlet ports 91 positioned downwardly adjacent the header 70 so as to provide combustion air to complete the combustion of the gases discharging from the furnace, before those gases pass through the space 78 defined by the end 72 of the nose baffle 73 and the wall of the boiler setting. Air is supplied to the tertiary air ports through a dampered duct 92 which receives preheated combustion air from the same source as the air supplied to the primary and secondary air ports.

In accordance with the invention, the residual liquor supplied to the furnace is delivered through the rotating nozzle 44′ which is positioned at the lower end of the liquor supply tube 47′. The supply tube 47′ is rotated at a predetermined rate so as to discharge the residual liquor in a sheet-like spray pattern, where the maximum dimension of the spray pattern is substantially vertical and generally parallel to the direction of flow of the gases rising through the furnace 60. The nozzle 44′ is rotated by a motorized drive mechanism 93 which is mounted within the vestibule 75 formed by the nose baffle 73 and the lower drum 74 of the boiler.

The sheets of liquor 50′ discharged from the opposite sides of the spray nozzle 44′ (see FIG. 4) are projected across the furnace and impinge upon the furnace walls. In its travel across the furnace, the liquor is partially dehydrated with the dehydration process continuing while the liquor is being deposited upon the walls of the furnace. As the moisture content of the liquor is reduced, the resulting char falls from the walls due to the force of gravity acting thereon to land in a pile on the hearth 86 in the bottom of the furnace. The jets of air introduced through the primary air ports 85 impinge upon the char pile and reduce the inorganic chemicals in the char, with the chemicals discharging from the furnace as a molten stream through a central outlet 94 formed in the bottom of the hearth.

As shown in FIG. 5, the spray nozzle may be formed as a cap-like nozzle member 95 attached to the lower end of the liquor discharge pipe 47′. The cap member is provided with a vertically elongated slot 96 opening on opposite sides, so that the liquor discharged from the nozzle will be projected in a fan-like spray pattern. Other forms of spray nozzles may be used such as, for example, that shown in U.S. Patent 2,161,111. Furthermore, as desired, the liquor discharge pipe 47 or 47′ may be of the telescoping type so that the nozzle 44 or 44′ may be retracted when liquor discharge therethrough ceases. Alternatively, the nozzle and the liquor discharge pipe may be liquid cooled to protect the assembly from furnace radiant heat. Under normal circumstances, however, the liquor spray pipe and nozzle will be cooled by the liquor flowing therethrough so that other protective measures to insure satisfactory service life will be unnecessary.

The area of the furnace wall surface impacted by the liquor spray is determined by the angularity of spray established by the nozzle slot configuration as influenced by the length of spray travel between nozzle and wall. When desired the area of wall surface contact may be increased irrespective of nozzle slot configuration by producing nozzle reciprocation along the axis of nozzle rotation. Under such conditions, the frequency of reciprocation should not correspond with the rate of rotation of the nozzle. Thus, for each rotation of the nozzle the spray impact on the walls will not correspond, but will overlap to some extent, and the increase in the width of the area of impact will be effective throughout the perimeter of the furnace. A suitable mechanism for rotating and reciprocating the liquor supply pipe 47 (or 47′) and the spray nozzle is illustrated in FIG. 6. As shown, the pipe is rotated by gear 97 which is affixed to the pipe 47, and driven by pinion 98. The reciprocation is accomplished by a camming surface 99 riding on a roller 100 which in turn is supported on a gear 101 which is driven by a pinion 102. Both of the pinions are rotated from the same source, but the ratios are different, so that the roller 100 movement is different from that of the surface 99 and the spray impacting on the walls of the furnace chamber will overlap during successive rotation of the nozzle.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. Apparatus for the recovery of chemicals and heat from waste liquor containing inorganic chemicals and combustible organic matter comprising fluid cooled walls defining a vertically elongated furnace chamber having a heating gas outlet in the upper portion thereof, means for passing the heating gases leaving said furnace outlet through a convection gas pass to cool said gases by heating a vaporizable fluid, a hearth at the bottom of said furnace chamber on which the inorganic chemicals are smelted, means for removing molten chemicals from said hearth, and means for spraying said liquor into said furnace chamber in a substantially vertical sheet occupying a minor portion of the horizontal cross-section of said furnace and to minimize entrainment of liquor in the gases entering said convection gas pass including a liquor supply pipe projecting into and susbtantially along the vertical axis of said furnace chamber, means defining a spray nozzle above said hearth connected to said liquor supply pipe and having a discharge opening formed to project a vertically elongated horizontally narrow spray of said liquor against a vertically elongated portion of the wall of said furnace, and means for slowly rotating said nozzle about an axis substantially coaxial with the vertical axis of said furnace so as to deposit sprayed liquor in a circumferential band on the furnace wall on each revolution thereof.

2. Apparatus for the recovery of chemicals and heat from waste liquor containing inorganic chemicals and combustible organic matter comprising walls defining a vertically elongated furnace chamber having a heating gas outlet in the upper portion thereof, a hearth at the bottom of said furnace chamber on which combustion of the organic matter occurs and the inorganic chemicals are smelted, a smelt spout for removal of smelt from said furnace, and means for spraying said liquor into said furnace chamber so that the liquor spray occupies a minimum of the horizontal cross-section of said furnace chamber including a liquor supply pipe projecting into and substantially along the vertical axis of said furnace chamber, means defining a spray nozzle above said hearth connected to said liquor supply pipe and having outlets therein formed to project vertically elongated horizontally narrow sheets of said liquor in spray form in opposite directions transversely across said furnace and to impinge on the opposite internal surface of the walls of the furnace in a narrow vertically elongated pattern, and means for slowly rotating said nozzle about an axis substantially coaxial with the vertical axis of said furnace so as to deposit the liquor in a continuous band on the furnace walls on each revolution thereof.

3. Apparatus for the recovery of chemicals and heat from waste liquor containing inorganic chemicals and combustible organic matter comprising walls defining a vertically elongated furnace chamber having a heating gas outlet in the upper portion thereof, a hearth at the bottom of said furnace chamber on which the inorganic chemicals are smelted, means for withdrawing smelt from said furnace, and means for spraying said liquor into said furnace chamber in a substantially vertical sheet occupying a minor portion of the horizontal cross-section of said furnace to minimize entrainment of liquor in the gases leaving said furnace including a liquor supply pipe projecting into and substantially along the vertical axis of said furnace chamber, means defining a spray nozzle above said hearth attached to said liquor supply pipe and having a discharge opening therein formed to project a vertically elongated horizontally narrow spray of said liquor against the wall of said furnace, means for slowly rotating said nozzle about an axis substantially coaxial with the vertical axis of said furnace, and means for reciprocating said nozzle along the axis of said furnace and out of synchronization with said rotation to extend the upper and lower margins of the area of spray impact on the wall of said furnace chamber during rotation of the spray nozzle.

4. Apparatus for the recovery of chemicals and heat from waste liquor containing inorganic chemicals and combustible organic matter comprising walls defining a vertically elongated furnace chamber having a heating gas outlet in the upper portion thereof, a hearth at the bottom of said furnace chamber on which the inorganic chemicals are smelted, means for withdrawing smelt from said furnace, and means for spraying said liquor into said furnace chamber in a substantially vertical sheet occupying a minor portion of the horizontal cross-section of said furnace including a liquor supply pipe projecting into and substantially along the vertical axis of said furnace chamber, means defining a spray nozzle above said hearth connected to said liquor supply pipe and having a discharge opening formed to project a vertically elongated spray of said liquor against a wall of said furnace, said sprayed liquor contacting a horizontally narrow vertically elongated portion of said furnace wall, and means for slowly rotating said nozzle about an axis substantially coaxial with the vertical axis of said furnace so as to deposit sprayed liquor in a circumferential band on the furnace wall on each revolution thereof.

5. Apparatus according to claim 1 wherein said furnace is of circular horizontal cross-section for substantially uniform deposition of said liquor on the wall of the furnace.

6. Apparatus according to claim 1 wherein said furnace is of rectangular horizontal cross-section, and the angular rate of spray nozzle rotation is substantially equal during each revolution thereof.

References Cited in the file of this patent
UNITED STATES PATENTS

| | | |
|---|---|---|
| 1,779,537 | Goodell | Oct. 28, 1930 |
| 2,354,175 | Wilcoxson | July 18, 1944 |
| 2,673,787 | Greenawalt | Mar. 30, 1954 |
| 2,726,666 | Oxford | Dec. 13, 1955 |